US008756319B2

(12) United States Patent
Waites

(10) Patent No.: US 8,756,319 B2
(45) Date of Patent: Jun. 17, 2014

(54) AUTOMATIC REAUTHENTICATION IN A MEDIA DEVICE

(75) Inventor: Nigel Waites, Lakeville, MN (US)

(73) Assignee: BBY Solutions, Inc., Richfield, MN (US)

( * ) Notice: Subject to any disclaimer, the term of this patent is extended or adjusted under 35 U.S.C. 154(b) by 68 days.

(21) Appl. No.: 13/153,583

(22) Filed: Jun. 6, 2011

(65) Prior Publication Data
US 2012/0144035 A1 Jun. 7, 2012

Related U.S. Application Data

(60) Provisional application No. 61/355,811, filed on Jun. 17, 2010.

(51) Int. Cl.
*G06F 15/173* (2006.01)
*G06F 15/16* (2006.01)
(52) U.S. Cl.
USPC .............................. 709/225; 726/5
(58) Field of Classification Search
USPC .......................................................... 709/225
See application file for complete search history.

(56) References Cited

U.S. PATENT DOCUMENTS

| | | | |
|---|---|---|---|
| 7,035,854 B2 * | 4/2006 | Hsiao et al. ............................ 1/1 |
| 7,111,323 B1 * | 9/2006 | Bhatia et al. ....................... 726/8 |
| 7,146,504 B2 * | 12/2006 | Parks et al. .................... 713/178 |
| 7,801,998 B2 * | 9/2010 | Mazzagatte et al. ........... 709/227 |
| 7,861,288 B2 * | 12/2010 | Tsuruoka et al. ................ 726/10 |
| 8,046,596 B2 * | 10/2011 | Ciaffi et al. .................... 713/300 |
| 8,474,014 B2 * | 6/2013 | Headley ............................. 726/2 |
| 8,549,291 B2 * | 10/2013 | Choi et al. ...................... 713/168 |
| 2002/0133578 A1 * | 9/2002 | Wu ................................. 709/222 |
| 2002/0184351 A1 * | 12/2002 | Istvan et al. ................... 709/222 |
| 2004/0111621 A1 | 6/2004 | Himberger et al. |
| 2005/0187934 A1 * | 8/2005 | Motsinger et al. ................. 707/9 |
| 2005/0278778 A1 * | 12/2005 | D'Agostino et al. .............. 726/5 |
| 2006/0218337 A1 * | 9/2006 | Hashimoto .................... 711/100 |
| 2007/0299681 A1 | 12/2007 | Plastina et al. |
| 2008/0178265 A1 * | 7/2008 | Tsuchiya et al. ................... 726/3 |
| 2010/0010932 A1 * | 1/2010 | Law et al. ........................ 705/42 |
| 2010/0100951 A1 * | 4/2010 | Kutt et al. ......................... 726/9 |
| 2010/0242062 A1 | 9/2010 | Reynolds et al. |
| 2010/0297983 A1 * | 11/2010 | Aarni et al. .................... 455/411 |
| 2011/0063132 A1 * | 3/2011 | Trum ......................... 340/932.2 |
| 2013/0097681 A1 * | 4/2013 | Jaber et al. ........................ 726/6 |

OTHER PUBLICATIONS

PCT International Search Report and Written Opinion, PCT/US2011/041059, Dated Oct. 14, 2011.

* cited by examiner

*Primary Examiner* — Joshua Joo
(74) *Attorney, Agent, or Firm* — Beck & Tysver PLLC

(57) ABSTRACT

A system and method is presented for verifying the ability to use stored authentication information when accessing a remote media service. A media device, such as a television, is described that stores authentication information for a remote media service. Such authentication information may include a user name and a password. Because media devices may be re-sold, returned for re-sale, or refurbished, it is necessary to automatically disable the authentication information to prevent a second owner from accessing the services and accounts belonging to a first owner. The ability to use authentication information is disabled upon a long delay in accessing the service, a complete power down cycle, a change in IP address, or a change in network interfaces used to access the network.

10 Claims, 3 Drawing Sheets

# AUTOMATIC REAUTHENTICATION IN A MEDIA DEVICE

FIELD OF THE INVENTION

The present application relates to the field of media devices that access network services. More particularly, the described embodiments relate to media devices that automatically authenticate information with network services, and automatically invalidate such authentication information on the occurrence of certain triggering events.

DETAILED DESCRIPTION

Figure 1:
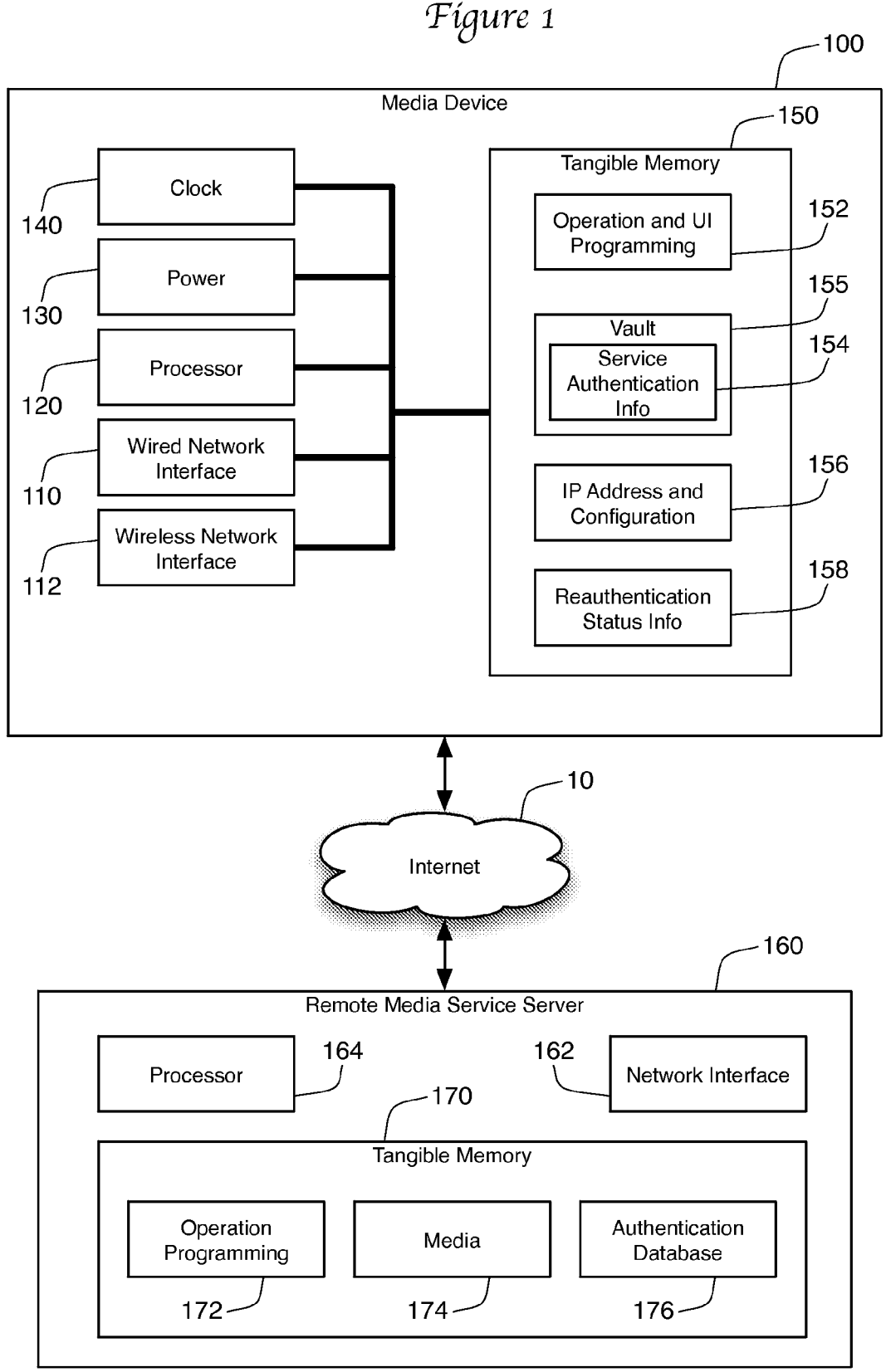
FIG. 1 is a schematic diagram of an embodiment of the present invention in communication with a network server.

FIG. 1 shows one embodiment of a physical media device 100 that communications with a remote media service server 160 over a network 10 such as the Internet 10. The media device 100 is able to access content or services on the media service server 160 for the benefit of users of the media device 100. For example, the remote media service 160 may provide audio and/or video media data for display or performance on the media device 100. If the media device 100 were a television, a network server 160 of the media service could provide streaming video or even feature movies for display on the television 100. If the media device 100 were an audio music player, the remote media service 160 could stream or download music to the device 100. In addition, the network server 160 could alternatively provide non-content services for the device 100. For instance, the server 160 might provide updates, maintenance patches, or other downloads for maintaining or improving the firmware and other programming found on the media device 100.

In order to communicate over the network 10, the media device 100 shown in FIG. 1 includes two different network interfaces, namely a wired network interface 110 (such as a gigabit Ethernet port) and a wireless network interface 112 (such as a Wi-Fi or IEEE 802.11 interface). Note that while the media device 100 includes two network interfaces 110, 112, it is possible to implement an embodiment of the present invention using only a single network interface. In the preferred embodiment, the network interfaces 110, 112 provide a TCP/IP stack in order to access the Internet 10. In other embodiments, the interfaces 110, 112 are any communication interface that allows the media device 100 to communicate with the remote media service server 160 over a network 10. A processor 120 configures the device 100 to use one of the interfaces 110, 112 to access the network server 160 over the network 10. The processor 120 handles the high level functionality of the device 100, and may include one primary CPU or can contain a plurality of processing units specialized to handle particular functions within the device 100. For example, the device 100 could use the Cell processor developed by the STI consortium to handle various functions and image processing tasks within the device 100.

The media device 100 operates from power provided by component 130. In the preferred embodiment, component 130 is a power supply 130 that converts AC current to DC power, although it would be possible to implement numerous features of the present invention using only a battery power supply as power component 130. The power from component 130 operates the processor 120 and the network interfaces 110, 112. A clock 140 may also draw power from component 130, but in one embodiment the clock 140 is provided power from a separate battery supply (not shown) in order for the clock 140 to operate continuously even when the power supply 130 is unplugged from an AC power source. The clock 140 may be a secure clock, meaning that the clock 140 would not be modifiable except by a secure clock server. Secure clocks are helpful in a variety of digital rights management contexts, particularly when dealing with time limited licenses.

The processor 120 obtains programming 152 for the operation and user interface (UI) of the device 100 from tangible memory 150. Such memory 150 can be any type of standard, tangible memory, including RAM, ROM, PROMs, flash memory, or one or more hard drives, or some combination of these memories. The memory 150 should be persistent, so that the contents of memory 150 persist in the lack of power from power supply 130. In one embodiment, data is stored on a persistent device, such as flash memory or a hard drive, and then moved during operation to non-persistent yet faster memory, such as RAM.

Memory 150 also contains authentication information 154, which the media device 100 uses to authenticate the device 100 with the network server 160. Such authentication information 154 may include a username and password chosen by a user when the user subscribed to the service provided by the network server 160. A user can input authentication information 154 into the media device 100 using the user interface programming and an input mechanism (such as a remote control or keyboard) for the device 100. Rather than utilizing a user-defined username, the network server 160 may identify the device 100 using a unique device identifier. Device identifiers are useful in circumstances where access to the network server 160 is limited to a particular device 100 as opposed to a unique individual.

Authentication information 154 is stored in persistent memory 150 so that the user does not need to authenticate their identity with the network server 160 upon every access to the server 160. Instead, the processor 120 uses programming 152 and one of the network interface 110, 112 to establish a connection with the network server 160, and then supplies to the server 160 the authentication information 154 pre-stored in memory 150. This information 154 allows the device 100 to automatically "log into" the server 160 and access its services without requiring user input.

In one embodiment, authentication information 154 for a plurality of services is stored together in a password-protected vault 155. A vault 155 allows a user to unlock all of their authentication information 154 with a single master password, even if the authentication information for each service accessed by the user's device 100 has a separate password. These types of vaults 155 are also referred to as password or account managers. As long as the user knows the master password, the vault 155 can be authenticated and all of the authentication information 154 within the vault 155 can be used by the device 100.

As part of the ability to use the network 10, the device 100 must maintain network configuration information 156. If the network 10 is the Internet, this network configuration data 156 will include the device's IP address, the network's subnet mask, the network address of the router, and the network location for a DNS server. While this information can frequently be obtained on-demand from a router (not shown) that provides access to the network 10, this information 156 is nevertheless stored in memory 150 in order to properly configure and use the network interfaces 110, 112 and to determine whether the device 100 requires user reauthentication.

The network server 160 also contains a network interface 162, a processor 164, and tangible memory 170. The tangible memory 170 may be composed of the same types of memory as the memory 150 in device 100. In one embodiment, the tangible memory 170 contains programming 172 for the operation of the service, media or other content 174 that may be desired by the device 100, and an authentication database 176.

The network server 160 receives a request for the media or other content 174 from the media device 100 over the network 10 through network interface 162. The processor 164 receives this request and handles the request in accordance with programming 172. The programming 172 will instruct the processor 164 that it is necessary to authenticate all requests for services to ensure that the requester is authorized to receive the media 174. This authentication is accomplished by comparing the service authentication information 154 provided by the device 100 against the authentication database 176. If the authentication information 154 matches the data for an authorized user or device in the database 176, the processor 164 is authorized to provide services to the device 100. In one embodiment, the network server 160 then provides the media 174 across the network 10 to the device 100. For example, the user of a network-connected television 100 may use the network server 160 to browse available feature movies 174. Upon selection of a movie 174, the server 160 provides the movie 174 to the television 100 for viewing by the user. The movie 174 may be provided via download, in which case the data containing the entire movie is downloaded by the device 100 through the Internet and stored in its entirety within memory 150. Alternatively, the movie content 174 may be streamed over the network 10, in which case the media device 100 may control the stream by issuing commands to the server 160 over the network 10.

The ability to store authentication information 154 in persistent memory 150 greatly simplifies the use of the device 100 by a user by eliminating the need for user authentication upon every access of server 160. Unfortunately, this ability is also the source of security vulnerabilities. User accounts on the network server 160 are frequently fee-based, meaning that users pay valuable consideration for the ability to access the services provided by server 160. In addition, server 160 will frequently allow an authenticated user to incur additional charges on their account as they access their accounts on server 160. For example, server 160 may provide unlimited streaming of some videos to a television 100 for a monthly fee, while further requiring users to pay an additional fee for each premium movie that is viewed. When a user's service authentication information 154 is stored on the media device 100, anyone having possession of the media device will be able to access the user's account. This makes the account vulnerable to those who acquire the media device fraudulently, such as through theft. In addition, the account would be vulnerable to use by users who obtained the device legitimately, such as upon resale of the media device in the used market or upon resale of the device by a retailer upon a return or exchange of the device 100.

To avoid inappropriate access to the service authentication info 154 and consequently to the services provided by the server 160 on a user's account, the present invention will require reauthentication by the user upon the occurrence of a triggering event. Information that is used to determine whether a triggering event has occurred is stored in memory 150 as reauthentication status info 158.

Figure 2:
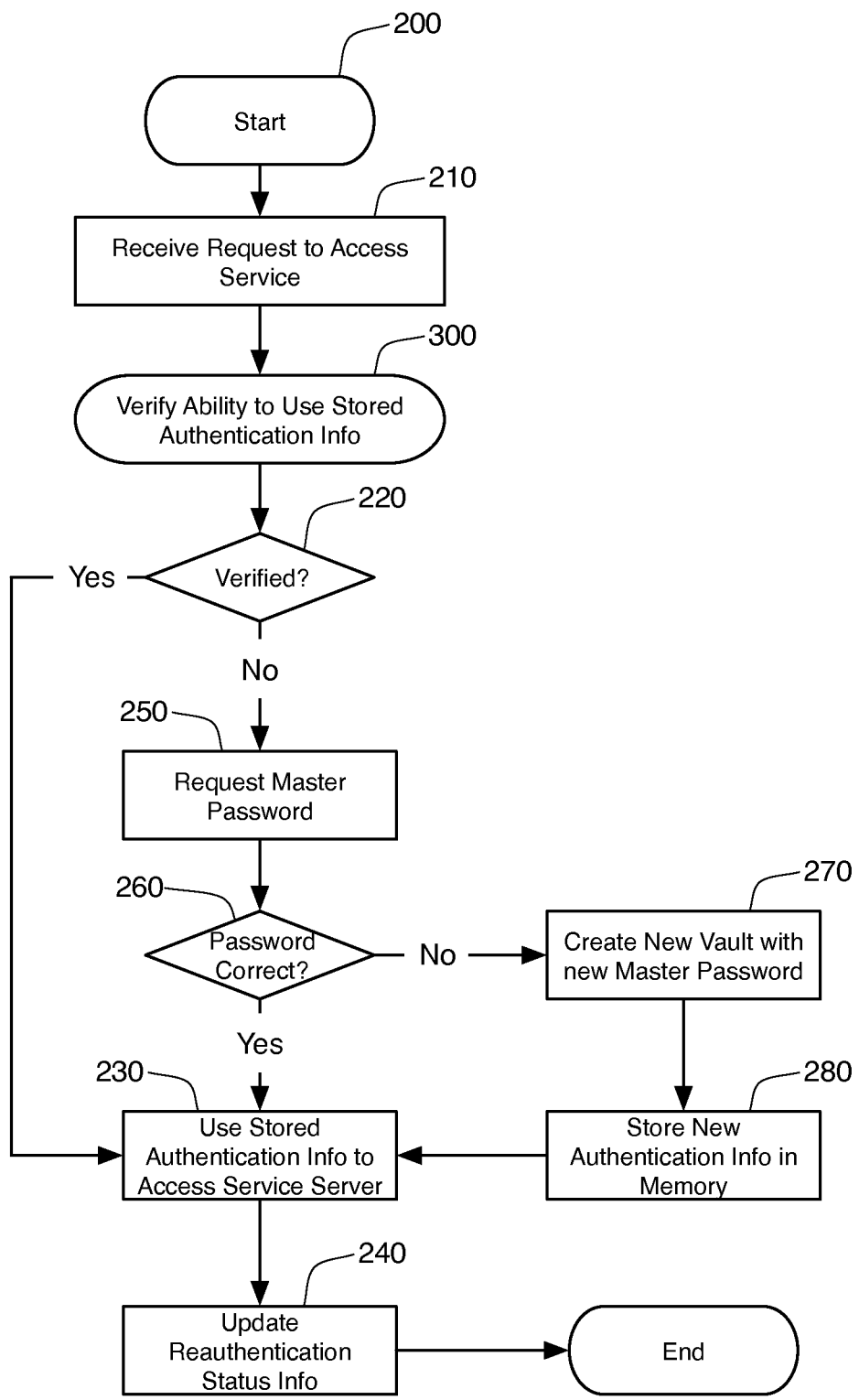
FIG. 2 is a flow chart showing the general process for the invalidation of authentication information.

The process 200 of requiring reauthentication is shown in the flow chart of FIG. 2. The first step 210 is for the device 100 to receive a request to access the service provided by service server 160. Next, at step 300, the device 100 verifies whether the service authentication information 154 may be used to access the server 160. Step 300 may be implemented in a variety of ways, which are described in more detail below in connection with FIG. 3. In the preferred embodiment, the process 300 for verifying the ability to use the stored authentication information 154 is based upon historical information about past operations of the media device 100. This historical information is shown generally in FIG. 1 as reauthentication status information 158.

If the test or tests evaluated at step 300 verify the ability to use information 154, the device 100 uses the service authentication information 154 at step 230 to access the server 160. The details surrounding this access are used to update the reauthentication status information 158 at step 240. For instance, step 240 might store the following information in the reauthentication status information 158: the service server 160 that was accessed, the time of the access, the network interface used for the access, and the IP address of the device. After this information 158 is updated, the process 200 then ends.

If information 154 cannot be used to access the server 160, process 200 requires the user of the device 100 to reauthenticate themselves to the device. Assuming that a vault 155 is being used to secure authentication information 154, the user will be requested to enter the master password for the vault 155 at step 250. If step 260 determines that the master password entered by the user is the correct password for the vault 155, the user is considered reauthenticated. This means that the stored service authentication info 154 for the desired service will be utilized at step 230 to access the service server 160, and the reauthentication status information 158 will be updated at step 240.

If the user is unable to enter the correct password as determined by step 260, then the device 100 will allow the user to create a new authentication vault 155 at step 270. This new vault 155 will have a new master password selected by the user. When creating a new vault 155, the device 100 may erase the old vault 155. This would have the effect of removing all authentication information 154 stored within that vault 155. While this might inconvenience users who temporarily forget their password, such a system would ensure that that the authentication information 154 input by one user would not remain on the device 100 after the device 100 has been transferred to a new user.

Alternatively, the device 100 may allows multiple vaults 155 to be stored in memory 150 at one time. This would allow multiple users of the device 100 to each have their own authentication information 154 stored on the device 100 simultaneously. Programming 152 would allow users to select their vault of authentication information when using the device 100. When switching between vaults, the device 100 preferably requires that the user enter the master password for that vault. While the embodiment that allows multiple vaults 155 of authentication information 154 to coexist in memory 150 would be useful in the context of multiple users accesses different service accounts, the security of the device 100 is lessened when the device does not automatically delete the existing vault when the user cannot enter the correct master password at step 250.

After the creation of a new vault 155, the user will enter new authentication information 154 for the service server 160 at step 290. This new information is stored in the vault 155 for later use by the device 100. At this point, the stored authentication information 154 is used to access the service server at step 230, and the reauthentication status information 158 is updated at step 240.

In some embodiments, the device 100 does not use a vault 155 having a master password to manage the authentication information 154 for multiple accounts. Instead, the authentication information 154 for each service is separately stored in memory 150. In this case, if step 220 determines that information 154 can no longer be used to access the server 160, the device 100 would require the user to enter (or reenter) their authentication information 154 for the service server 160. This newly entered authentication information 154 would then be stored in the memory 150 and be used to access the network server 160.

Figure 3:
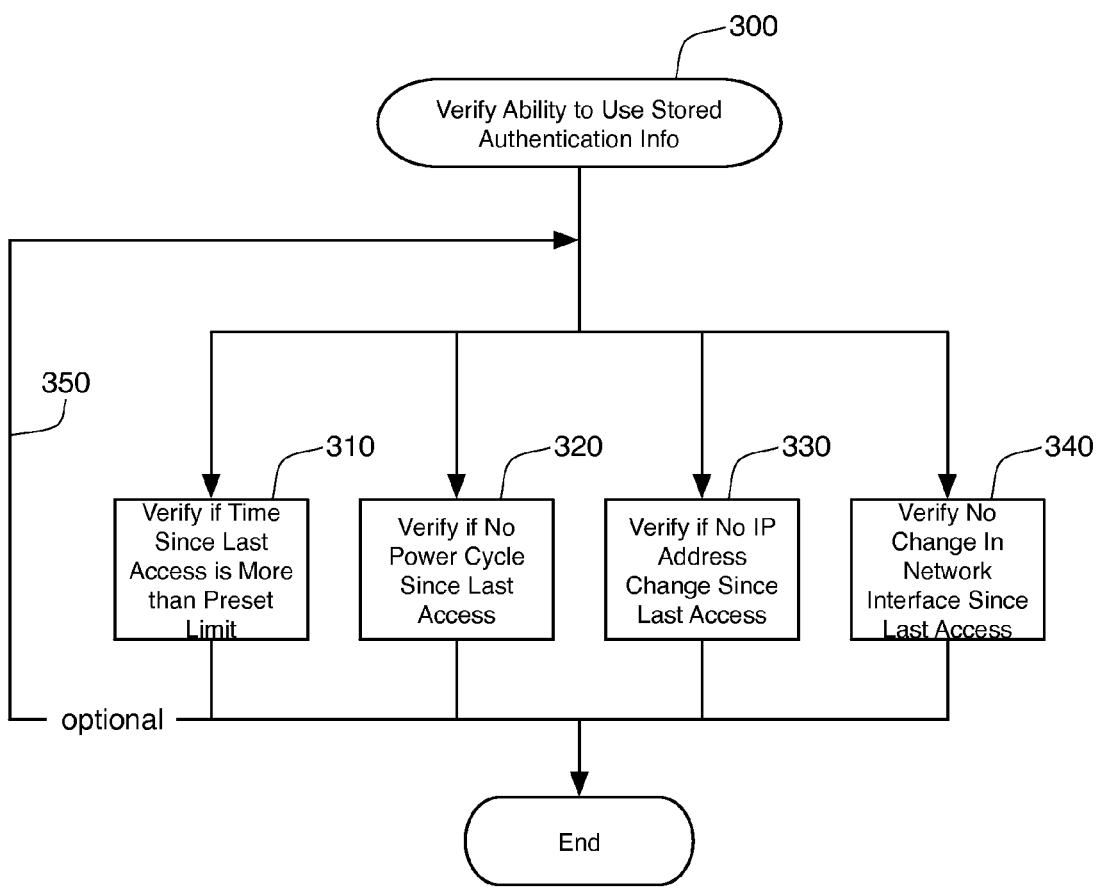
FIG. 3 is a flow chart detailing the step of verifying the ability to use stored authentication information.

As shown in FIG. 3, process 300 utilizes one or more tests 310-340 to determine the useability of the stored authorization information 154. In the first test 310, the reauthentication status info 158 contains the time of the last access made by the device 100 to the remote server 160. The time of last access (either to this particular service server 160 or to any service server 160) is compared by the processor 120 against the current time of clock 140. If this difference is greater than some predetermined period (such as seven days), the verification steps 210-220 fail and the user will need to reauthenticate at step 250.

In the second test 320, the reauthentication status info 158 contains not only the time of the last access made to server 160, but also that last time the device 100 went through a complete power cycle such as by power supply 130 being removed from an AC power source (i.e., the device was unplugged). This test 320 takes advantage of the fact that a change in possession of the device 100 will most frequently require that the device 100 be unplugged from a power source before being moved to a new location. The processor 120 is able to track power cycles by storing the time on clock 140 in memory 150 during every start-up of device 100. If the time of the last power up is after the time of the last service access time, this test 320 has failed and reauthentication will be required. Alternatively, this test 320 can be implemented by having the processer 120 set a flag in the reauthentication status info 158 upon every restart. If this flag is encountered at test 320, the test fails and reauthentication 250 is required. The processor 120 would then clear this flag as part of step 240 to ensure that the flag will not be set the next time process 200 operates unless another complete power cycle has occurred.

The third test 330 requires that the IP address or other network settings 156 of the device 100 not have changed since the last service server access time. In order to detect this condition, the processor 120 stores the IP address of the device 100 at step 240 during each access of the network server 160. In this way, differences between the last stored IP address and the current IP address are noted at the next access of a server 160. Alternatively, the processor 120 can set a flag in status info 158 every time the network configuration changes. If such a network configuration change flag is detected, test 326 can invalidate the service authentication info 154 and then reset the flag upon updating the authentication info 154 at step 240.

The fourth test 340 requires that the network interface 110, 112 used to access the network 10 not change between each access of the network server 160. For instance, if the wired network interface 110 were used the previous time a network server 160 was access, the service authentication information 154 would be validated only if the same wired network interface 110 were used to access server 160 the next time. If the wireless interface 112 were used, the fourth test 340 would invalidate the stored authentication info 154 and require the user to reauthenticate in step 260. Of course, it is possible to have multiple network interfaces 110, 112 of the same type, such as a plurality of wired network interfaces 110. The fourth test 340 could invalidate info 154 on any change of the network interface 110, even a change from one wired interface to another. As discussed for the previous tests, this test 340 could be implemented either by comparing the previous network interface 110, 112 (as indicated in status info 158) against the current interface 110, 112, or by setting a flag in status info 158 upon every change in the network interface 110, 112 used to access the network 10.

Line 350 on the flow chart of FIG. 4 is labeled as optional, and indicates that two or more of these tests 310-340 can be run in series. For instance, one embodiment may require that no power cycles be noted in test 320, and that the network interface not have change as noted in test 340. This embodiment would not use test 310 and 330. As would be clear to one skilled in the art, any combination of one to four of the tests 310-340 could be implemented using standard programming techniques. The choice of tests 310-340 may be based on the preference of the manufacturer of the device 100, or upon the characteristics of the device 100. For example, test 310 may not be useful in a media device 100 that does not contain a trusted or secure clock 140. If the clock 140 could be altered by a user, test 310 could be circumvented by a knowledgeable user and access to the remote service 160 could be obtained under the account of the device's previous owner.

In another embodiment, the device 100 is capable of accessing a variety of remote network services, each requiring separate authentication information. These various services could be operated on a single server 160, or each could exist on separate servers found at separate network addresses on network 10. The method 160 may operate independently for each service, such that the device 100 maintains and analyzes the reauthentication status info 158 separately for each service. Alternatively, the method 160 could be operated so that all service authentication info 154 is treated as a whole, which can either pass or fail method 160 as a group.

The many features and advantages of the invention are apparent from the above description. Numerous modifications and variations will readily occur to those skilled in the art. For example, FIG. 1 shows the device 100 accessing a network service that is operating on a single network server 160. This configuration was presented for ease of explanation, as it is well known that such services typically operate on a plurality of physical computers operating in conjunction to provide a single network service. Since such modifications are possible, the invention is not to be limited to the exact construction and operation illustrated and described. Rather, the present invention should be limited only by the following claims.

What is claimed is:

1. A media device comprising:
   a) a network interface in communication with a remote media service over a network;
   b) a memory storing authentication information for authenticating the media device to the remote media service;
   c) a processor in data communication with the memory and the network interface;
   d) programming stored on the memory and implemented by the processor to:
      i) verify the ability to transmit the authentication information by determining whether an Internet address of the media device changed since a previous access of the remote media service, and ii) transmit the authentication information after verification to the remote media service.

2. A media device comprising:
a) a network interface in communication with a remote media service over a network;
b) a memory storing authentication information for authenticating the media device to the remote media service;
c) a processor in data communication with the memory and the network interface;
d) programming stored on the memory and implemented by the processor to:
   i) verify the ability to transmit the authentication information by determining whether the duration since a most recent access of the remote media service exceeded a predetermined time limit, and
   ii) transmit the authentication information after verification to the remote media service.

3. A media device comprising:
a) a network interface in communication with a remote media service over a network;
b) a memory storing authentication information for authenticating the media device to the remote media service;
c) a processor in data communication with the memory and the network interface;
d) programming stored on the memory and implemented by the processor to:
   i) verify the ability to transmit the authentication information by determining whether power to the media device was interrupted since a previous access of the remote media service, and
   ii) transmit the authentication information after verification to the remote media service.

4. A media device comprising:
a) a network interface in communication with a remote media service over a network;
b) a memory storing authentication information for authenticating the media device to the remote media service;
c) a processor in data communication with the memory and the network interface;
d) programming stored on the memory and implemented by the processor to:
   i) verify the ability to transmit the authentication information by determining whether the network interface used by the media device changed since a previous access of the remote media service, and
   ii) transmit the authentication information after verification to the remote media service.

5. A media device comprising:
a) a network interface in communication with a remote media service over a network;
b) a memory storing:
   i) authentication information for authenticating the media device to the remote media service,
   ii) historical information about past operation of the media device;
c) a processor in data communication with the memory and the network interface;
d) programming stored on the memory and implemented by the processor to:
   i) verify the ability to transmit the authentication information by examining the historical information about past operation of the media device, and
   ii) transmit the authentication information after verification to the remote media service.

6. The media device of claim 5, wherein the historical information about past operation of the media device is the IP address of the media device at a time when the authentication information was previously transmitted to the remote media service.

7. The media device of claim 6, wherein the time when the authentication information was previously transmitted is a most recent time that the authentication information was used to authenticate the media device to the remote media service.

8. The media device of claim 5, wherein media device further comprises a secure clock, and further wherein the historical information about past operation of the media device is a time of the last connection with the remote media service as determined by the secure clock, and further wherein the authentication information is verified only if the time of the last connection is within a predetermined amount of time of the time on the secure clock.

9. The media device of claim 5, wherein the media device further comprises a power supply, and wherein the historical information about past operation of the media device is an indicator as to whether the power supply has been removed from a power source.

10. A method for authenticating a media device with a remote media service comprising:
a) storing in a tangible memory:
   i) authentication information for the remote media service, and
   ii) past status information of the media device at the time of a previous authentication made with the remote media service;
b) receiving a request to access the remote media service;
c) determining a current status of the media device;
d) comparing the current status of the media device with the past status information to verify the ability to transmit the authentication information;
e) transmitting the authentication information after verification to the remote media service; and
f) storing in the tangible memory the current status of the media device.

* * * * *

UNITED STATES PATENT AND TRADEMARK OFFICE
CERTIFICATE OF CORRECTION

PATENT NO.           : 8,756,319 B2
APPLICATION NO.      : 13/153583
DATED                : June 17, 2014
INVENTOR(S)          : Waites Page 1 of 1

It is certified that error appears in the above-identified patent and that said Letters Patent is hereby corrected as shown below:

Specification

Column 4, Line 45, Delete "that that" and insert --that--, therefor.

Column 5, Line 40, Delete "processer" and insert --processor--, therefor.

Claims

Column 8, Line 29, In Claim 8, delete "of time of the time" and insert --of time--, therefor.

Signed and Sealed this
Eighth Day of September, 2015

Michelle K. Lee
*Director of the United States Patent and Trademark Office*